United States Patent [19]

Firester et al.

[11] 4,069,484
[45] Jan. 17, 1978

[54] DEFECT PLOTTING SYSTEM

[75] Inventors: Arthur Herbert Firester, Skillman; Joseph Paul Walentine, Princeton, both of N.J.

[73] Assignee: RCA Corporation, New York, N.Y.

[21] Appl. No.: 691,204

[22] Filed: May 28, 1976

[51] Int. Cl.² .................................... G01D 5/39
[52] U.S. Cl. ........................ 346/33 F; 346/33 A; 346/137; 346/165; 356/237; 358/128
[58] Field of Search ............... 346/33 F, 33 A, 137, 346/165, 164, 163, 162, 150; 250/570, 572; 179/100.3 V; 358/128, 106, 300, 296; 356/200, 199, 237

[56] References Cited

U.S. PATENT DOCUMENTS

| 2,052,383 | 8/1936 | Cooley | 358/296 X |
| 3,429,991 | 2/1969 | Ortlieb | 346/163 X |
| 3,434,149 | 3/1969 | Brousseau | 346/137 X |
| 3,909,138 | 9/1975 | George | 356/237 |

Primary Examiner—Joseph W. Hartary
Attorney, Agent, or Firm—Eugene M. Whitacre; William H. Meagher; Henry N. Garrana

[57] ABSTRACT

High speed writing apparatus, for mapping 1:1 polar plots of disc record defect locations on disc-shaped electrosensitive paper, accepts electrical signals representing defect occurrences from a defect detector which scans the disc record surface in a spiral scanning pattern. These signals activate a high voltage switch circuit that produces an electric current between an electric writing pen stylus and a conducting surface of a turntable of the printing apparatus upon which the disc shaped electrosensitive paper is mounted. Relative motion is established between the turntable and the writing pen in a manner causing markings resulting from pen activations to be located on the electrosensitive paper with radial and circumferential positions corresponding to the locations of the defects appearing on the disc record, thereby generating 1:1 polar plots of the defect locations on the paper. The writing pen scans the paper disc surface in a spiral scanning pattern in synchronization with the defect detector scanning of the disc record. The writing pen is a multistylus pen used in a balanced configuration to effect high speed marking of defect locations without causing damage to the paper.

5 Claims, 4 Drawing Figures

DEFECT PLOTTING SYSTEM

The present invention relates generally to a novel plotting system employing high-speed data recording in a spiral pattern, and particularly to a plotting system which may be advantageously employed to record the locations of defects in the spiral groove of a high density information record, such as a video disc of the type described in U.S. Pat. No. 3,842,194, issued to Jon K. Clemens.

The defect plotting principles of the present invention are applicable where faithful records of groove surface conditions are required speedily. An illustrative environment, where such application of the principles of the present invention is particularly advantageous, is the manufacture of video disc records. In the processes for manufacturing a video disc record, such as the type supra, formulation of a uniform spiral groove free of significant amounts of undesirable asperities is an important factor for obtaining high quality video signal recordings. Each stage of record manufacture can be a critical stage wherein undesirable build-up of asperities that affect the production of quality video records must be minimized.

In one illustrative process for producing high quality video disc records having spiral grooves, a spiral groove is made by mechanically cutting a trapezoidal cross-section groove in a copper-coated aluminum disc, and coating the grooved surface with an electron beam sensitive material. The coated disc is mounted on a turntable of an electron beam disc recorder in the path of a finely focused beam of electrons, that is turned on and off, exposing selected portions of the groove bottom as the disc is rotated and translated with respect to the impinging beam. Those portions of the groove struck by the electron beam are removed by subsequent development of the sensitive material. After exposure and development, the master disc has the relief pattern that is desired in the final records. Molds for making stampers for producing production line records are made from these masters. In the final stages of manufacturing a video disc, a vinyl substrate is formed with the desired relief pattern, using a stamper made from a mold; the substrate is coated with a metal by a vacuum sputtering process; the metal is coated with a styrene dielectric by a glow discharge process; and the styrene is coated with a layer of oil by an evaporation process.

During each of the above-described record manufacturing processes, various kinds of flaws can develop, which may affect the record groove quality, and which are difficult to detect in view of the fineness of the groove structure typically employed in video disc (e.g., 5555 groove convolutions per inch).

In the copending U.S. patent application Ser. No. 691,206 now U.S. Pat. No. 4,030,835, of Arthur Firester and Istvan Gorog, entitled DEFECT DETECTION SYSTEM, and concurrently filed herewith, a system for detecting groove structure defects is disclosed which rapidly probes the grooved surface of the disc record with a light beam in a spiral probing pattern, developing an electrical impulse indication of the illumination of each surface region containing a groove structure defect. The present invention provides a novel data plotting system which may be advantageously employed with the defect detecting apparatus of the Firester and Gorog application to obtain a record, in highly useful form, of the locations of groove structure defects.

In accordance with the principles of the present invention, a high speed marking apparatus is provided for forming 1:1 polar plots of defect locations on disc-shaped electrosensitive paper. The electrosensitive paper disc is clamped in contact with the conductive surface of a rotating turntable. Electrical signals representing defect locations, from external equipment such as the defect detector of the above-mentioned copending application of Firester and Gorog, are coupled to signal receiving circuits in the marking apparatus which utilize these signals to produce actuating pulses for actuation of a high-voltage switch circuit when defect locations are to be designated. The high voltage switch circuit is coupled between a stylus of an electric writing pen in contact with the paper disc surface, and the conducting surface of the turntable. Illustratively, the writing pen is of a multistylus form, with but one stylus energized for marking purposes, but with the remaining unenergized styli present to provide a balanced force against the electrosensitive paper in the region where the defect locations are to be designated, to prevent the marking stylus from penetrating the electrosensitive paper during recording of the defect locations. During the defect location recording, relative translational motion is established between the turntable and the writing pen in a manner causing the pen to traverse the surface of the electrosensitive paper disc in a spiral scanning pattern in synchronization with the defect detector scanning of the grooved disc record.

Pursuant to a further optional feature of the present invention, a nozzle is used to direct a flow of air from an air source onto a surface of the multistylus pen in a direction to force the pen into contact with the electrosensitive paper.

By obtaining 1:1 polar plots of defect locations during the various stages of record manufacture, the manufacturer is readily provided with means for improving his yield, and can readily discover his weak or deficient areas of quality control.

Figure 1:
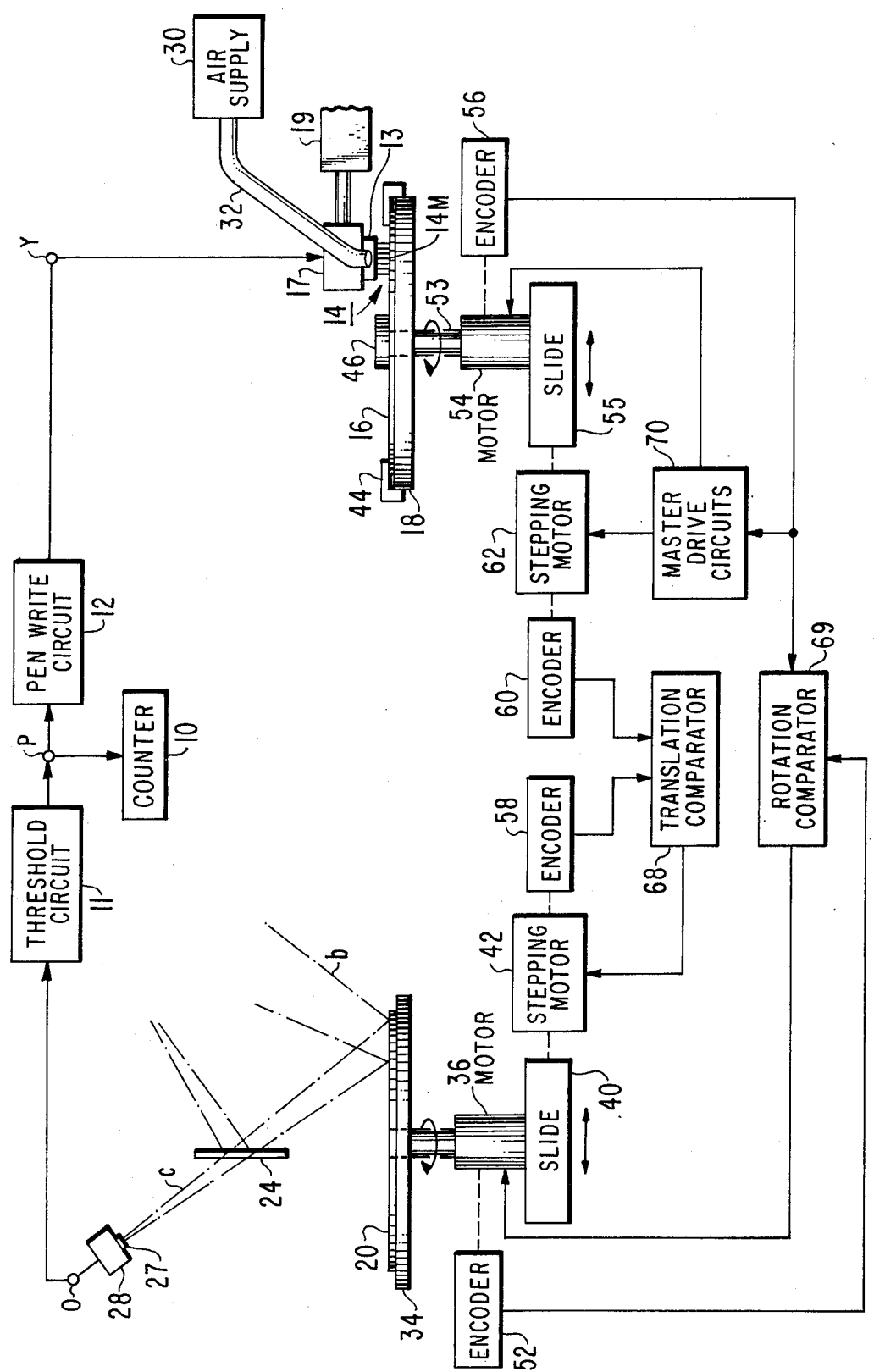
FIG. 1 illustrates, partially by block diagram representation, a system for detecting and recording the locations of defects in the groove structure of a grooved disc, which system embodies the principles of the present invention.
Figure 3:
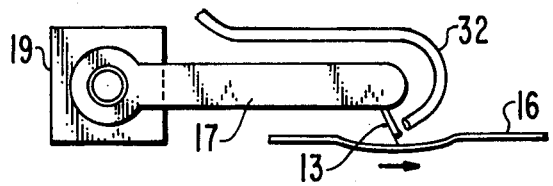
Figure 4:
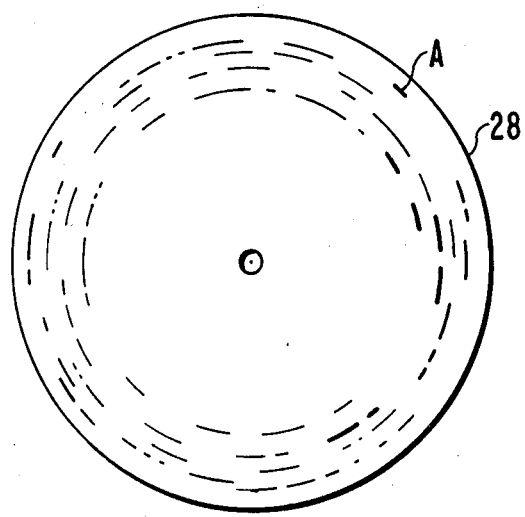

FIG. 3 provides a detailed view of the mechanical mounting of an electric writing pen employed in the FIG. 1 system; and FIG. 4 provides a plan view of a defect location record formed by the FIG. 1 system.

Referring to FIG. 1, a converging beam of light "b", emanating from a coherent light source (not shown) incorporating a laser, for example, and focused to a point beyond the surface of a spirally grooved video disc record 20, illuminates the grooved surface with a light spot that spans a plurality of convolutions of the groove. The record 20 is mounted on a turntable 24, which is rotated by a motor 36. The turntable 24 and its driving motor 36 are mounted on a slide 40, which is subject to a translational motion in a radial direction under the control of a stepping motor 42. As a consequence of the combination of the rotational and translational motions, the grooved surface of disc record 20 is scanned by the illuminating light beam in a spiral pattern (of a coarser pitch than the groove spiral). Illustratively, the coarser pitch is of such a value that the grooved disc record surface, which requires 30 minutes for normal play, is scanned in a period of 3–5 minutes.

Light is reflected by the illuminated record surface region toward a beam splitter 24 (e.g., a semi-transparent mirror). Beam splitter 24 permits a portion of the light it receives to pass towards a photodetector 28, while reflecting the remainder towards another photodetector (not shown) that may be utilized, for example, in a servo system for controlling the orientation of the light beam "b" incident upon the surface of the disc 20 (as explained more fully in the aforementioned copending application of Firester and Gorog).

The groove structure in the illumination region, in the absence of defects, provides a regular pattern of depressions and elevations, which effectively serves as a diffraction grating (with a grating pitch determined by the groove convolution pitch) to diffract the light passing to the photodetectors in a fixed pattern. This light diffraction results in the formation of an undeviated zero diffraction order cone "c" and a plurality of additional, deviated cones of light (not shown) corresponding to higher diffraction orders.

The undeviated zero diffraction order cone "c" converges toward a point at the center of the photosensitive region of detector 28 while the higher order cones of light (not shown) converge at points spaced from this photosensitive region. To prevent detector 28 from converting light energy to electric energy when normal groove structure is illuminated, a light blocking means 27 is disposed over the center region of detector 28 to intercept the zero diffraction order cone "c". But when defects disturb the regularity of the groove structure in an illuminated region, confinement of light to the aforesaid cones is no longer maintained and the unblocked regions of the photosensitive surface of detector 28 will receive light energy, which is converted thereby to electrical energy signalling the illumination of a defect in the spiral groove.

The electrical output of photodetector 28, signalling the illumination of a defect, appears at terminal 0 as a DC voltage which varies in amplitude in proportion with the amount of light energy that is converted to electrical energy by photodetector 28 (i.e., low levels of illumination produce low amplitude voltages, while high levels of illumination produces high amplitude voltages).

This DC voltage from photodetector 28 is coupled to threshold circuit 11. Threshold circuit 11 is used to compare the amplitude of the DC voltage that are received from photodetector 28 with a reference voltage of a preset amplitude. Voltage amplitudes which exceed the amplitude of the reference voltage trigger a monostable multivibrator circuit contained within the threshold circuit 11 to produce a pulse signal output of a fixed amplitude and of a fixed duration at terminal P. Voltage amplitudes which do not exceed the amplitude of the reference voltage have no triggering effect on the multivibrator circuit. Defects causing the production of voltage amplitudes lower than the reference voltage amplitude are deemed negligible defects of the groove structure.

The fixed duration output pulses of threshold circuit 11 which appear at terminal P are coupled to a pen write circuit 12. Pen write circuit 12 includes an electronic switch which is switched on by the presence of a pulse output at terminal P, and is switched off in the absence of a pulse output at terminal P. The output terminal Y of pen write circuit 12 is coupled to one (14M) of the styli of a multistylus writing pen 14.

Multistylus writing pen 14 is illustratively a seven styli pencartridge of the type used in teletype equipment. A preferred embodiment for pen 14 is the seven point electric writing pen of Scope Data (Stylus Print Head No. 518-088-01). A stylus holder element 13 of pen 14 is inserted in to the end of a pen mount 17 which is pivotally mounted to a mounting structure 19. Mounting structure 19 is so located that pen mount 17 may be rotated to place the styli of pen 14 in a plotting position in contact with the exposed surface of a disc of electrosensitive paper 16 (e.g., a disc cut from a sheet of dry electrosensitive paper of the Fitchburg "Timemark 30" type) mounted on a conductive metal surface of a turntable 18. The paper 16 is held in place on turntable 18, so as to make good electrical contact with the metallic surface of turntable 18, by a rim clamp 44 and a center post clamp 46. Rim clamp 44 covers the outer perimeter of paper 16 mates with the outer edge of turntable 18 forming a tight fit with the edge of the paper 16 and the edge of turntable 18. Centerpost clamp 46 mates with the upper extremity of the shaft 53 of turntable 18 and contains an annular bottom surface that extends over a portion of the inner perimeter of the paper 16 when inserted over the shaft extremity.

The electrosensitive paper 16 permits the passage of current from pen 14 to the metallic surface of turntable 18. The current is returned to ground through a ground connection made to the shaft 53 of turntable 18; the shaft 53 is in electrical contact with the metallic surface of turntable 18.

Relative motion in a spiral scanning pattern is established between the pen 14 and paper 16, by means of the rotation of turntable 18 by motor 54, and the translation of turntable 18 on slide 55 by stepping motor 62.

In operation, the center stylus 14M of pen 14 is used as the marking stylus, while the six surrounding styli, three on each side of the center stylus, are used to provide a balanced force against the electrosensitive paper 16, particularly in the region where the current from pen 14 travels through paper 16, assuring that such region of paper 16 makes good electrical contact with the metallic surface of turntable 18. Also, the extra styli aid in the preventing the marking stylus 14M from penetrating paper 16 during recording of defect locations. To fine adjust the pressure of pen 14 against paper 16, nozzle 32, located above the styli, directs air from air source 30 onto a surface of the stylus holder element 13 of pen 14 so as to control the pressure pen 14 exerts against the contact region of paper 16.

During the plotting of defects on paper 16, the turntable 18 is rotated and translated in synchronization with the rotation and translation of turntable 34, so that pen 14 traces a spiral path on paper 16 that matches the spiral path traced by the incident beam "b" over the grooves of disc record 20. In FIG. 1, an illustrative arrangement for effecting the desired synchronization is shown wherein the motions of the paper disc supporting turntable 18 are employed as references, with the grooved disc record supporting turntable 34 slaved thereto. While alternative arrangements are feasible, the illustrated arrangement is advantageous in facilitating individual defect inspection subsequent to the defect plotting operations, as will be explained in greater detail subsequently.

In the FIG. 1 arrangement, master drive circuits 70 control energization of motor 54 (effecting rotation of turntable 18) and stepping motor 62 (effecting translation of turntable 18) so that a ratio of rotation to translation is established which provides a desired coarse spiral scan by electric pen 14 over the electrosensitive paper 16 when turntable 18 is in operation. To maintain this ratio fixed, information concerning the angular position of rotation motor 54, as developed by encoder 56, is supplied to master drive circuit 70 so that the drive for stepping motor 62 may be controlled thereby.

To slave the translational motion of turntable 34 so that of turntable 18, information concerning the angular position of stepping motor 62, developed by encoder 60, is supplied to translation comparator 68, for comparison with information concerning the angular position of stepping motor 42, as developed by encoder 42. In the presence of a difference between the angular positions of the two motors, the output of comparator 68 is utilized to alter the drive of stepping motor 42 to bring it into correspondence with stepping motor 62.

Similarly, to slave the rotational motion of turntable 34 to that of turntable 18, the output of encoder 56 is supplied to rotation comparator 69 for comparison with information concerning the angular position of rotation motor 36, as developed by encoder 52. In the presence of differences in angular positions of the two motors, the output of comparator 69 is used to alter the drive for motor 36 to cause the angular positions of motor 36 to match those of motor 54.

A particular advantage of this master/slave turntable arrangement is realized at times when, subsequent to defect plotting operation, it is desirous to closely inspect a particular defect on disc 20, for example, with a microscope. To accomplish this operation, master drive circuits 70 are disabled to permit manual operating of turntable 18. Turntable 18 is manually operated to position the stylus pen 14M of FIG. 1 over the particular defect location marking. Since turntable 34 is slaved to turntable 18, the incident beam "b" of FIG. 1 will illuminate the particular defect on disc 20, which may be observed through a microscope disposed to receive light from the reflected beam path. Thus, individual disc groove defects may be readily located for microscopic examination.

A further feature of the FIG. 1 arrangement is provision of a defect counter 10, connected to respond to the output of threshold circuit 11. Counter 10 provides a numerical count of the number of pulses produced by threshold circuit 11. By providing the user with a means for totalling the number of significant defects detected, along with plots of the defect locations, the FIG. 1 system enables the user to obtain a reasonably complete characterization of the groove structure of disc record 20.

Figure 2:
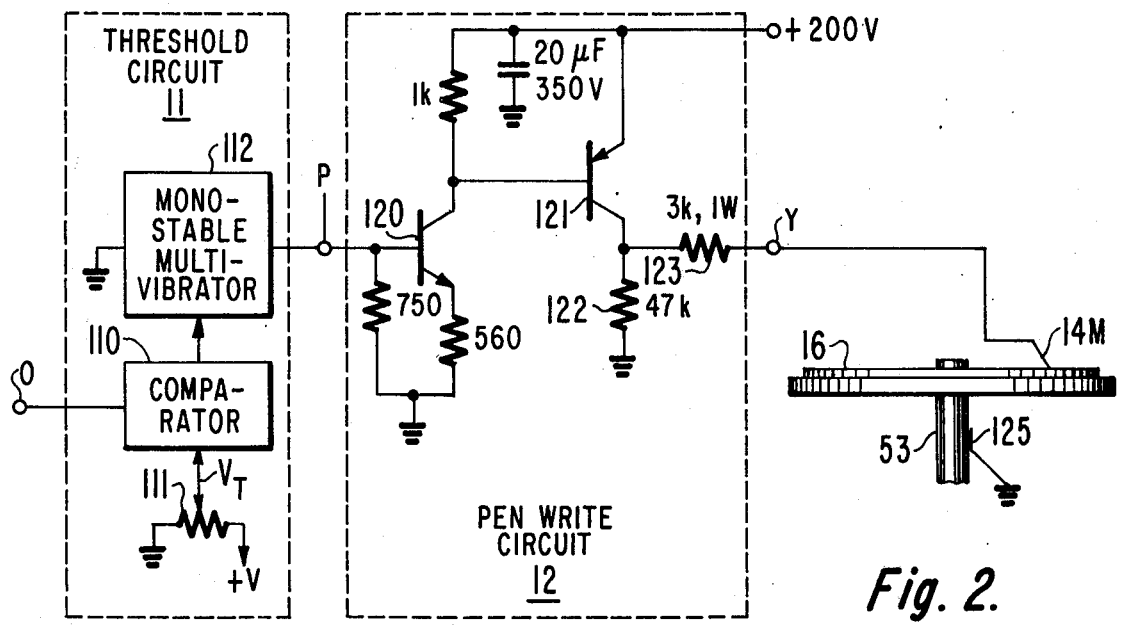
FIG. 2 illustrates, partially schematically and partially by block diagram representation, illustrative circuit arrangements that may be employed in the defect location recording apparatus of the FIG. 1 system.

In FIG. 2, illustrative circuit arrangements for threshold circuit 11 and pen write circuit 12 are shown. Threshold circuit 11 includes a voltage comparator 110, having one input connected to the output terminal 0 of photodetector 28 (FIG. 1), and a second input connected to the adjustable tap of a threshold voltage selecting potentiometer 111. The varying DC voltage level signals from photodetector 28 are compared with a threshold voltage $V_T$, as set by the tap adjustment on potentiometer 111. Whenever the photodetector output voltage exceeds the selected threshold voltage $V_T$, the comparator 110 develops an output which serves to trigger a monostable multivibrator 112. When multivibrator 112 is triggered "on", it produces a pulse of a fixed amplitude for a fixed duration (illustratively a positive 4 volt pulse of a 1 msec duration) at the output terminal P of threshold circuit 11.

The pen write circuit 12 includes a NPN switching transistor 120, with its base directly connected to terminal P. The switching transistor 120 is turned on whenever the base goes positive, i.e., upon receipt of an output pulse from the monostable multivibrator 112. The collector of switching transistor 120 is directly coupled to the base of a PNP output transistor 121. The emitter of the output transistor 121 is connected to the positive terminal of a relatively high voltage (e.g. 200 volts) power supply, while the collector of the output transistor 121 is connected via a resistor 122 to the negative terminal (e.g., ground) of the power supply. When the switching transistor 120 is pulsed on, the base of the output transistor 121 becomes forwardly biased relative to the emitter thereof, and output transistor 121 is rendered conducting.

The collector of output transistor 121 is connected via a current limiting resistor 123 to the middle stylus 14M (of the multistylus pen 14 of FIG. 1) as the latter contact electrosensitive paper 16 mounted on turntable 18. The conductive surface of turntable 18 is returned to the negative terminal of the power supply via a grounded brush 125 that contacts the rotating turntable shaft 53. During each period of conduction by output transistor 121, current passes between stylus 14M and the turntable surface to effect a marking on the contacted surface region of the electrosensitive paper 16.

Referring now to FIG. 3, a side view of the pen mount 17 for pen 14 is illustrated. Air hose 32 directs a supply of air to the stylus holder 13 located above the point where the writing pen styli make contact with the electrosensitive paper 16. During periods when the paper 16 is rotated at high rates of speed, sufficient force must be exerted by the styli against the paper 16 to obtain suitable markings. The air emanating from the nozzle of hose 32 pivots stylus holder 13 in a direction forcing the styli to exert force against paper 16 to provide suitable markings during the high speed writing periods. The effect of this pressure on paper 16 in the contacted region is shown in exaggerated fashion in FIG. 3.

In reference to FIG. 4, an illustrative example of a 1:1 polar plot of defect locations on electrosensitive paper 16, as developed by the apparatus of FIG. 1, is presented. The defect locations are represented by each of the dash markings on the plot. The marking A points out the location of one of the several defect locations occurring near the outer perimeter of the disc record.

What is claimed is:

1. A defect plotting system for recording on electrosensitive paper a plot of the locations of significant defects appearing in the groove structure of a spirally grooved disc record; said plotting system comprising:
   A. defect detecting means for developing defect data in response to a probing of the grooved surface of said disc record in spiral scanning pattern; and
   B. defect plotting means comprising:
      1. a turntable having a flat metallic surface upon which said electrosensitive paper is placed;
      2. electric pen writing means, including a stylus subject to contact with said electrosensitive paper, for inscribing marks on said electrosensitive paper when actuated;

3. means for establishing relative motion between said turntable and said writing means in a manner causing said stylus to traverse said electrosensitive paper along a spiral path in synchronism with the probing of the grooved surface of said disc record;

4. means, responsive to said defect data, for generating an electrical writing pulse signal indicative of the reception of significant defect data; and an actuating circuit for said electric pen writing means, electrically coupled between said stylus and said turntable surface, and responsive to said writing pulse signal generation.

2. Apparatus in accordance with claim 1 wherein said electric pen writing means includes a multistylus writing pen, said multistylus writing pen including said stylus coupled to said actuating circuit and responsive to said writing pulse signals, and additional styli providing a force against said paper in a region surrounding said stylus for assuring that said electrosensitive paper region makes electrical contact with said metallic surface of said turntable.

3. Apparatus in accordance with claim 2 wherein said electric pen writing means includes a nozzle mounted near said multistylus pen for directing a flow of air on a surface of said multistylus writing pen in a direction tending to force said pen into contact with said paper.

4. In a system for inspecting the spirally grooved surface of a disc record for groove structure defects; wherein said grooved surface is probed, in a spiral probing pattern having a pitch which is coarse relative to the pitch of the spiral groove, by apparatus developing an electrical impulse whenever a disc record surface region exhibiting a groove structure defect is probed; defect location recording apparatus, comprising the combination of:

selectively actuated electric pen writing means, subject to disposal in contact with a surface of said electrosensitive paper disc;

means coupled to said disc record probing apparatus for causing said writing means to traverse said surface of said electrosensitive paper disc in a spiral scanning pattern substantially matching said spiral probing pattern;

pulse generating means, coupled to said disc record probing apparatus and responsive to said electrical impulses developed thereby, for generating an actuating pulse whenever said electrical impulses exceed a selected threshold amplitude; and means for utilizing said actuating pulses to actuate said electric pen writing means.

5. A system for plotting on a disc of electrosensitive paper the location of defects in the groove structure of a spirally grooved disc record, said system comprising the combination of:

a first turntable for supporting said disc record;

drive means coupled to said first turntable for causing rotation of said disc record at a first rotational rate;

means for directing a beam of light upon the surface of said disc record;

means for causing translation of said first turntable relative to said light beam at a first translational rate;

light sensitive means responsive to light reflected from said disc surface for developing an electrical output signal upon illumination of a groove defect;

a second turntable for supporting said disc of electrosensitive paper;

drive means coupled to said second turntable for causing rotation of said paper disc;

electric pen writing means, mounted for selective contact with the rotating electrosensitive paper disc, for marking said electrosensitive paper when energized;

means for causing translation of said second turntable relative to said electric pen writing means;

drive synchronizing means coupled to said first-named drive means and said second-named drive means for causing the rotation of said paper disc to occur at a rotational rate substantially matching said first rotational rate;

translation synchronizing means coupled to said first-named translation causing means and said second-named translation causing means for causing the translation of said second turntable to occur at a translational rate substantially matching said first translational rate;

pulse generating means coupled to said light sensitive means for generating an actuating pulse in response to the appearance of an electrical output signal exceeding a selected threshold value; and means for utilizing said actuating pulse to control energization of said electric pen writing means in order to effect marking of the electrosensitive paper region in contact with said electric pen writing means during the period of energization.

* * * * *